Patented Feb. 10, 1925.

1,526,033

UNITED STATES PATENT OFFICE.

SAMUEL PRICE WETHERILL, JR., OF HAVERFORD, PENNSYLVANIA.

METHOD OF AND MEANS FOR PROMOTING PLANT GROWTH.

No Drawing.   Application filed February 15, 1923. Serial No. 619,269.

*To all whom it may concern:*

Be it known that I, SAMUEL PRICE WETHERILL, Jr., a citizen of the United States, residing at Haverford, in the county of Montgomery and State of Pennsylvania, have discovered and invented certain new and useful Methods of and Means for Promoting Plant Growth, whereof the following is a specification.

My improvement relates to means for making practical commercial application of the fact that carbon-dioxide is beneficial to plant life.

Beneficial results obtained by use of limestone in soils not too depleted of their organic matter, and the phenomenal results obtained by the use of manure under conditions inhibitory to the growth of harmful organisms, both manifest the value of carbon-dioxide when released in the soil; but no application thereof has heretofore been made in the manufacture and sale of a commercial product combining these two features with a view to the maximum production of carbon-dioxide in the soil, at times and under conditions of maximum plant growth and with due regard to the creation of an environment for the plant roots in which harmful organisms will not thrive.

Although powdered natural limestone, (as distinguished from the hydrated lime often employed,) assuredly increases the carbon-dioxide content of acid soils; there are many coral, marl and limestone soils whose productivity would not be increased at all by the addition of lime stone, unless suitable organic matter, capable of sustaining the life of acid-forming bacteria, be also added.

Nearly all soils are benefited by the addition of animal manure but the available supply is insufficient for extensive fertilization, its transportation cost is prohibitive, it is extremely variable in its contents available for such benefit, and no satisfactory method or means has been found for drilling manure with seed so as to localize its application and attain economy. Even if manure were capable of such use; it is well known that it would be extremely dangerous to employ fresh manure in such manner, for its cleavage products attract and harbor protozoa and other micro-organisms which feed upon and destroy plant roots, and organisms favorable to plant life. Moreover, the losses, especially of nitrogen, accompanying the rotting of manure are costly.

Consequently, the prior art fails to satisfy the need of a product capable of being drilled into soil with seed, and containing only such organic carboniferous matter as is readily capable of fermentation, and containing nitrogenous matter in a form capable of sustaining only favorable bacterial life and thus productive of nitric acid which will act on intimately admixed limestone, thus releasing carbon-dioxide and at the same time maintaining the soil within the narrow limits of acidity and alkalinity in which such bacterial life may thrive.

In accordance with my present invention, I provide such a product by substituting powdered limestone for the major part of the other mineral matter in a composition otherwise such as contemplated in my co-pending applications for Letters Patent of the United States, which are respectively serially numbered 570,614 and 570,722.

All plant structures include two elements constituting the major portion of their substance, to wit, carbon and hydrogen, and the proportions thereof required to form such carbo-hydrates are well known. It is also well known that in the formation of such hydrates by assimilation of carbon and hydrogen by the plant tissue, the latter excretes oxygen; and the theory has been widely accepted that such assimilation is effected by the infiltration of water through the plant roots and the inhalation of carbonaceous gas from the atmosphere through the plant leaves, with incidental exhalation of oxygen.

However, the results of an extensive investigation which I have made regarding the nature and conditions of plant growth warrants the assumption that although deoxidation of both the carbon and hydrogen oxides, or their oxidized compounds found in plant tissues, takes place in the plant leaves, at the growing tips of twigs, and at the extremity of hair roots, and elsewhere within the plant; that carbon dioxide is assimilated mainly, if not wholly, through the plant roots, in the dilute aqueous solution of the soil, whether as carbon dioxide occluded in such solution, or as dilute carbonates.

Although, for ages, men have been stimulating plant growth by so amending soil that increased quantities of carbon dioxide are released therein; nevertheless, being misled by the assumption that carbon dioxide entered the plant structure only through the leaves, they have remained in ignorance of the fact that carbon dioxide, in association with hydrogen, is the major cause of such increased growth as they have attributed to a variety of other causes, some of which happened to be contributory but many of which are in fact negligible. It appears that the simple fact that carbon and hydrogen are the primary essentials of plant structure, has been obscured by the fact that a vast number of organic compounds is formed in the cycle of anabolism, metabolism and catabolism of any vegetation.

Such distinctions as have heretofore been made between those functions performed in the soil as a result of chemical and biochemical reactions, and those functions performed by the plant in the process of its growth and cell building, have been academic rather than practical in application to the agricultural art.

The importance of my discovery can best be appreciated after realization that in the general cosmic scheme the oxidizing function is performed by animals and animalculæ, certainly including the majority of known bacteria; whereas the reducing, deoxidizing function is effected by plants, which may include micro-organisms, such as those called "denitrifying bacteria" which are reputed to cause the deoxidation or reduction of nitrates and nitrites to ammonia.

Further understanding of my discovery may be facilitated by reference to the fact that when the metals, metalloids, or their compounds, especially hydrogen and carbon, are oxidized by animals, of whatever size, the process is invariably accompanied by the release of stored energy; such release being made possible by satisfying the open valences of the material to be reduced, with oxygen or appropriate acid radicals.

In the reverse process of deoxidation, smelting or reduction, which takes place mainly in the structure of the plant proper, solar energy is stored by the release of the oxygen which accompanies the charging process and the energy thus locked within the complicated carbohydric molecules is capable of being progressively released, proportionately to the extent to which the oxidation of the cleavage products progresses.

Thus it may be seen that, whereas, animal organisms, in order to live must consume the solar energy stored by plants in such reducing process, so plants in order to live must utilize oxides of the metals or metalloids which have been completely discharged of their energy and which are therefore available for the plant's purpose of reduction by solar energy.

In other words; whereas plants charge molecules of metals with solar energy; animals discharge them, expending such energy through their own bodies, and reconverting the metals to the oxidized condition, ready for a new plant.

Much confusion exists as to the service rendered by nitrogen in relation to said processes. The most important fact is that nitrogen is neither acid nor basic, but neutral. It is customary to designate nitrogen as a catalytic agent, in such processes, because its presence facilitates oxidation or decomposition of associated metallic compounds. Since, literally, the concept of catalysis is that of a destructive proceeding, relating to stimulation of oxidizing actions; the inference is that nitrogen is only serviceable in the period of decay preparatory to new plant assimilation and, therefore, it is necessary to understand the constructive service also rendered by nitrogen in facilitating the opposite or reverse process of reduction or deoxidation involved in plant growth. Hence, although nitrogen is recognized as of importance in such processes, its precise functions are not generally understood and such understanding may only be had upon the assumption that nitrogen not only facilitates the catabolism of plant decay, but also facilitates the anabolism of plant synthesis. For these reasons, and because it constitutes the important constituent of plant protein, the presence of nitrogen in the soil is a vital factor in soil fertility. However, a fine distinction must be made if the form in which nitrogen is added to the soil is to be suited to the service required. In the decomposition cycle, it serves as a vehicle for metals in a condition accessible to certain bacteria which are capable of oxidizing those metals and releasing the energy therefrom. For example; ammonia plus bacterial oxidation, equals energy absorbed by bacteria, plus nitric acid, plus water. Thus, the products resulting from bacterial consumption of the hydrogen energy or food values of ammonia, are nitric acid, water and the vitality to produce more bacteria. On the contrary; nitrogen added to the soil in the oxidized condition, say as nitric acid or as a nitrate, has no bacterial energizing or food value. In that form, it is not linked with a metal capable of further oxidization, but, on the contrary, tends toward the inhibition of further bacterial life, unless and until it comes into contact with limestone or other basic material capable of combining with it, forming a neutral salt harmless to animal life. However, in the completely oxidized form, nitrogen is ready for assimilation by the plant in water solution, where it facilitates the reducing processes which take place in plant synthesis and finally enters into the plant protein. Under the latter conditions, nitrogen facilitates synthetic composition; which, by the way, is a function the reverse of what is implied by the prefix "cat", in catalysis, which connotes decomposition.

From the foregoing considerations it may be observed that haphazard methods of introducing chemicals into soil, induced because temporary benefits ensue, in the form of immediate increase of crops, are fraught with grave danger to the recuperative possibilities of the soil and are almost certain to limit the power of the soil bacteria to produce the needed quantities of carbon dioxide, to afford plants the balanced ration necessary to the economical utilization of the so-called fertilizing ingredients.

Therefore, in my copending applications aforesaid, I provided a method and means for producing the balanced combination of mineral, organic and biological conditions under which all aspects of the cycle of decomposition and synthesis will be provided for, without reference to the importance of causing, along with such other conditions, the generation of the maximum quantity of carbon dioxide in the vicinity of the plant roots and under conditions of temperature and moisture conducive to plant growth. It is such latter extension of and improvement upon the inventions claimed in said copending applications that I desire to claim in this case.

I find that the rate, degree, and duration of activity of plants which is manifested by the infiltration of water through their roots and the elevation thereof through their tissues, is, apparently, dependent upon a single factor in the water thus induced, to wit, the quantity of its carbonaceous content. That is to say; there is, of course, an irreducible minimum of carbonaceous matter required for any plant growth, and the energy of the plant expended in pumping water through its roots, in efforts to satisfy that requirement, bears a direct relation to the amount of available carbonaceous material in the water. For instance, if a plant receives water having the ordinary average content of carbon dioxide; it pumps a certain quantity thereof during its seasonal period of growth. But, if the water supply is deficient in carbon dioxide, or its equivalent, the plant increases its pumping activity and elevates and evaporates sufficiently more water to furnish the required amount of carbonaceous matter, if available. Of course, such excessive evaporation subjects the plant to detrimental refrigeration; whereas, its life depends upon adequate absorption of solar energy. On the other hand, if the carbon dioxide content of the water is abnormally large, the pumping activity of the plant may be correspondingly less to attain a given growth. It naturally follows, and I have found it to be a fact, that if a plant is supplied with water containing an abnormal percentage of carbon dioxide, the energy of the plant otherwise expended in pumping activity is manifested in increased growth and productivity. As the amount of energy expended by plants in such pumping work is not a matter of common knowledge, even to persons skilled in this art; I here note that tests have shown that from the time of its initial germination until the conclusion of its growth, a field of wheat will absorb, elevate, and evaporate a quantity of water sufficient to cover the field several feet deep, if the water has only the normal content of carbonaceous material. That vast amount of plant work may be reduced, and the energy required for it largely conserved and manifested in increased productivity, by increasing the amount of available carbon dioxide in the water supplied. Although tests show that water surcharged with carbonic acid gas and supplied to soil has a stimulating effect upon plants growing in that soil; it is well known that such carbonated water tends to eliminate said gas into the atmosphere and, of course, that method of supplying soil and plants with an abnormal quantity of carbon dioxide is wasteful, because of the evanescence of such gas. That is to say, a large percentage of all carbon dioxide thus supplied to soil escapes into the atmosphere before any plants have opportunity or time enough to utilize it.

Therefore, my invention includes the method of promoting plant growth by supplying a material capable of gradually releasing carbon dioxide or its equivalent at the plant roots, in such manner and at such a rate as to conserve the carbon dioxide and render it available for use by the plants throughout the entire period of growth of the latter. The means I employ for that purpose includes any material capable of generating or liberating carbonic acid gas, or its equivalent, in the environment of a plant root, under conditions which are essential to plant life. For instance, there are certain limits of temperature and moisture within which a given plant life may exist and my invention includes the provision of means to generate or liberate carbon dioxide within those limits and to inhibit such generation or liberation in the absence of the favorable thermal and hygroscopic conditions.

The specific material hereinafter claimed resembles calcium carbid in its capacity to generate gas upon acquisition of moisture; but differs from said carbid in that it is so composed that its rate of disintegration is automatically controlled to such a degree as to avoid waste of the gas thereby released.

Vast sums of money are expended in the purchase and application of so-called fertilizers upon assumptions as to their utility which are predicated upon their contents of nitrogen or some other element which is not the limiting factor in relation to the plant growth, but has been found as a constituent in such fertilizers which have been previously used with favorable results. Such usual method of procedure has resulted in great economic waste.

On the contrary, in accordance with my invention, the utility of any substance purporting to be a plant fertilizer may be precisely determined by ascertaining its capacity for producing or liberating carbonic acid gas at such a rate as to be available to a plant without waste of such carbonaceous material. Therefore, my invention is advantageous in that it affords a method and means for avoiding such waste and effecting consequent economy in the development of all agricultural products.

My invention includes the various novel features of procedure and means for effecting the same herein set forth and particularly a method and means for presenting carbon dioxide, (by generation or liberation thereof,) in position to be available to a plant root.

A common means for producing carbonic acid gas, for carbonating water, is by reaction between natural limestone rock and an acid. Although such rock is largely composed of calcium carbonate, it usually includes a considerable percentage of magnesium carbonate. Either of said carbonates may be disintegrated, with evolution of carbon dioxide, by reaction with nitric or sulphuric acid. Moreover, the rate of such reaction in the soil may be controlled by comminuting such minerals and coating them with any material which is more or less soluble in water. For instance, in my copending applications aforesaid for Letters Patent of the United States, I describe a composition which includes comminuted limestone provided with a more or less adherent coating of organic matter which is not only capable of controlling the rate of disintegration of such mineral in the presence of acidulated water, but affords a favorable culture medium for the soil bacteria which are capable of producing acid in soil and thus promoting such reactions as above contemplated. However, I do not desire to limit my present invention to any particular material for producing or liberating carbonic acid gas, or its equivalent, as my invention is of a more generic and comprehensive character, as above indicated. Nevertheless, my improved plant fertilizing composition aforesaid may be taken as a typical example of such materials as may be employed in accordance with the present invention. For instance, natural limestone comminuted until it will pass through a sieve of say twenty meshes to the inch, and coated with an aqueous extract of organic matter such as peat, humus, municipal garbage, etc., may be employed as a means for promoting plant growth in accordance with the method herein contemplated. It may be observed that such organic matter is in fact cooked in its preparation for use as such coating material. However, that is not essential, as any suitable organic matter may be employed in a raw state. When a product thus made is gradually dessicated, the acids produced by the bacteria therein while in the moist state tend to accumulate and be retained in the organic matter; dispersion of the acids being thus retarded while the product is relatively dry. However, such accumulated acidity is not injurious to plants as it is in an inactive although potential state. However, when the product again becomes moist, such accumulated acidity becomes active but is almost immediately neutralized by the limestone, as the moisture causes the dilute acids to disperse, into contact with the mineral matter containing compounds capable of neutralizing such acids, for instance, calcium oxide, calcium carbonate, etc. On the other hand, when such product is very wet, too rapid production of acids by the aerobic bacteria which it contains is prevented because of the anaerobic conditions then prevailing in the product. Consequently, such product gives a basic reaction due to the predominating alkaline ingredients thereof becoming dissolved in the water. However, the composition of such product is so balanced, as aforesaid, as to prevent harm to the plant or bacteria present, by any excess of alkalinity. However, such material is advantageous in that it is automatically controlled in its reaction with acidulated water, by inherent thermal and hygroscopic factors which inhibit its disintegration except within the range of temperature and moisture which are essential to the average agricultural plant growth. So that such material may be allowed to lie in the soil, in an inert state, during seasons of thermal and hygroscopic conditions which inhibit plant growth, without serious loss of potency of the material to induce auto-acidulation of the soil, by bacterial action, and thus produce or liberate carbon dioxide, when subjected to the proper thermal and hygroscopic conditions which are essential to plant life and growth.

In the practical application of my invention to agriculture or floraculture, I prefer to provide test apparatus which includes a box capable of forming an inclosure with upper and lower compartments separated by a foraminous diaphragm; both the top and the bottom of said box forming removable gas-tight closures. A sample of soil which it is desired to test for improvement in accordance with my method may be placed in the upper compartment upon said diaphragm which is capable of supporting such soil while permitting water to percolate through it, into the lower compartment. Thereupon, any material which is capable of generating or liberating carbonic acid gas, may be applied to said soil with sufficient water to effect such generation or liberation; so that the water may absorb the gas thus produced and subside through the soil, thus charging the latter. The surplus water which drips into the bottom compartment may be returned to the top of the soil in the upper compartment, until the reaction contemplated is ended. During such reaction, both the rate and volume of evolution of carbonic acid gas may be precisely ascertained. Moreover, the fertility of the soil thus treated may be ascertained by allowing seeds to germinate and grow in it. Thus, the real value of a given material, as far as the promotion of plant growth in a given soil is concerned, may be precisely ascertained, and, consequently, the most effective means for fertilizing a given soil may be predetermined and utilized without the waste and losses heretofore incurred as above contemplated.

Furthermore, in order to avoid waste of the carbonating material thus applied to the soil, for promotion of the growth of a given species of plant; it is desirable to ascertain the maximum quantity and rate of absorption of carbon dioxide which the given plant can assimilate in a given time, and to supply the soil with carbonating material of such nature as to meet those requirements, without waste of surplus gas.

In other words; in accordance with my invention, the carbon dioxide requirements of a given crop, for its maximum growth and production, may be ascertained and suitable means for producing or liberating carbon dioxide local to the roots of such plants at the rate required by the latter, may then be employed without waste.

It is well known, to those skilled in this art, that arable land differs very widely in its composition in different localities, and, in fact, a mass of soil of alkaline reaction may immediately adjoin another mass of soil of acid reaction. Therefore, it may be observed that the materials required for promotion of plant growth in different soils may be of widely different character. Consequently, I do not desire to limit myself as to the composition of such materials or as to the details of their application to the soil, as it is obvious that various modifications may be made therein, without departing from the essential features of my invention, as defined in the appended claims.

I claim:

1. The method of promoting plant growth, which consists in determining the maximum quantity of carbon dioxide which the plant can assimilate in a given time; and furnishing such quantity to the root of said plant, by means capable of evolving carbon dioxide at such predetermined rate; such means including thermal and hygroscopic factors which restrict such evolution to the range of temperature and moisture essential to the plant life.

2. The method of promoting plant growth, which consists in determining the maximum quantity of carbon dioxide which the plant can assimilate in a given time; and furnishing such quantity to the root of said plant, by means capable of evolving carbon dioxide at such predetermined rate; such means including factors which restrict such evolution to the range of temperature and moisture essential to the plant life.

3. The method of promoting plant growth, which consists in furnishing, at the root of said plant, means capable of evolving carbon dioxide at the rate the plant can absorb such gas; such means being capable of an acid and alkaline reaction in the presence of moisture, and including thermal and hygroscopic factors which restrict such evolution to the range temperature and moisture essential to the plant life.

4. The method of promoting plant growth, which consists in furnishing, at the root of said plant, means capable of evolving carbon dioxide at the rate the plant can absorb such gas; such means including thermal and hygroscopic factors which restrict such evolution to the range of temperature and moisture essential to the plant life.

5. Means capable of stimulating plant growth and retarding deterioration of soil fertility, including a combination of organic and mineral matter, in which the cleavage of the organic products has been reduced to the simpler form of carbohydrates with minimum oxidation, and retaining food values for soil bacteria; and in which the mineral matter is capable of neutralizing acid products of the bacteria and coincidentally therewith of evolving carbon dioxide of inorganic origin additional to the carbon dioxide of organic origin.

6. Means capable of promoting plant growth and retarding deterioration of soil fertility, including a combination of organic and mineral matter, in which the cleavage of the organic products has been reduced to the form of carbohydrates with minimum oxidation, and retaining food values for soil bacteria; and in which the mineral matter is capable of neutralizing acid products of the bacteria and coincidentally therewith of evolving carbon dioxide of inorganic origin additional to the carbon dioxide of organic origin.

7. Means capable of promoting plant growth and retarding deterioration of soil fertility, including a combination of organic and mineral matter, in which the cleavage of the organic products has been reduced to the form of carbohydrates, and retaining food values for soil bacteria; and in which the mineral matter is capable of neutralizing acid products of the bacteria and coincidentally therewith of evolving carbon dioxide of inorganic origin additional to the carbon dioxide of organic origin.

8. Means for promoting plant growth, comprising a material capable of evolving carbon dioxide at a predetermined rate, and including factors which restrict such evolution to the range of temperature and moisture essential to the plant life.

In testimony whereof, I have hereunto signed my name at Philadelphia, Pennsylvania, this eighteenth day of October, 1922.

SAMUEL PRICE WETHERILL, Jr.

Witnesses:
M. T. Peacock,
M. A. Locke.